United States Patent [19]

Kubota

[11] 4,295,272

[45] Oct. 20, 1981

[54] VIBRATION CONTROL FOR MOWING MACHINE

[75] Inventor: Toshifumi Kubota, Katsuta, Japan.

[73] Assignee: Hitachi Koki Company, Limited, Tokyo, Japan

[21] Appl. No.: 143,862

[22] Filed: Apr. 25, 1980

[30] Foreign Application Priority Data

Apr. 28, 1979 [JP] Japan .................................. 54-52844

[51] Int. Cl.$^3$ ............................................ A01D 35/00
[52] U.S. Cl. ........................................ 30/276; 56/12.7
[58] Field of Search ................... 56/12.7; 30/276, 347, 30/296 R; 172/30; 74/574

[56] References Cited

U.S. PATENT DOCUMENTS

| | | | |
|---|---|---|---|
| 3,219,129 | 11/1965 | Yamada | 30/296 R |
| 3,346,955 | 10/1967 | Beneke | 30/296 R |
| 4,006,528 | 2/1977 | Katsuya | 30/276 |
| 4,122,601 | 10/1978 | Katsuya | 30/296 A |
| 4,179,805 | 12/1979 | Yamada | 30/296 R |
| 4,236,310 | 12/1980 | Muller | 30/276 |

*Primary Examiner*—Jimmy C. Peters
*Attorney, Agent, or Firm*—Lowe, King, Price & Becker

[57] ABSTRACT

In a mowing machine having an engine for driving a rotary blade via a centrifugal clutch, a shaft and a reduction gear assembly, the outer diameter of the shaft is selected such that the torsional natural vibration frequency of the rotational system extending from the engine to the rotary blade is less than one third of a rotational frequency above which the centrifugal clutch starts transmitting the engine output torque to the shaft. As a result, the torsional natural vibration frequency of the rotational system does not equal the rotational frequency or the half or one third of the rotational frequency of the engine so that undesirable resonance phenomenon will not occur.

10 Claims, 1 Drawing Figure

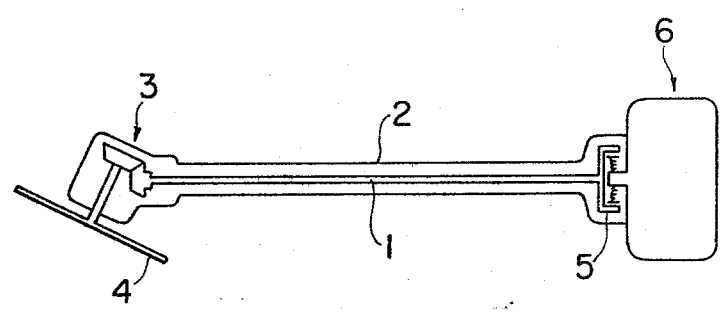

VIBRATION CONTROL FOR MOWING MACHINE

FIELD OF THE INVENTION

This invention generally relates to a mowing machine. More particularly, the present invention relates to a mowing machine having a prime mover, which mowing machine is adapted to cut weeds or the like.

BACKGROUND OF THE INVENTION

Conventional portable mowing machines having a prime mover, such as an internal combustion engine, have a handle means for supporting and moving the mowing machine so as to cut weeds, grass or the like as desired. The handle means is connected to a pipe which covers a shaft provided for transmitting the rotational torque of the prime mover to a rotary blade or a cutter unit. However, the rotational system extending from the engine to the rotary blade vibrates when the mowing machine operates, and therefore, the vibrations are transmitted via the handle means to the hands and arms of the operator. The vibrations from a mowing machine raise a serious problem since the operator of such machines is apt to suffer from an occupational disease.

According to one of the conventional techniques, which is disclosed in a Japanese Utility Model Publication No. 48-24600, a means for preventing vibrations from being transmitted to a handle means is provided on a pipe which covers a shaft connected between a prime mover and a rotary blade. The vibration proof means comprises a block of rubber mechanically connected via flange means between the outer surface of the pipe and one end of a secondary pipe which covers a portion of the first mentioned primary pipe. The handle means is connected to the secondary pipe so that the vibrations from the primary pipe are prevented from being transmitted to the handle means. However, this arrangement requires a complex construction, and therefore, the total weight of the mowing machine tends to be great.

While the above mentioned conventional technique was made to prevent the transmission of vibrations by blocking or attenuating the vibrations, there is another possibility for preventing vibrations. Namely, if the occurrence of vibrations in a mowing machine were prevented or if the intensity of the vibrations were very low, there would be no problem so that there is no need to block or attenuate the vibrations.

The vibrations in a mowing machine are caused by various factors, such as the direct vibrations from the prime mover, irregular rotations of the rotary blade, inaccuracy in the manufacturing precision of the rotational system, the resonance due to the transverse vibrations of the entire mowing machine, and the resonance due to the torsional vibrations in the rotational system. Among the above listed factors, the resonance due to the torsional vibrations is a potent cause so that the vibrations caused by this resonance have to be reduced in order to reduce the entire vibrations.

According to a conventional technique for reducing this resonance phenomenon the diameter of the shaft is made large so that the natural vibration frequency increases. Since this countermeasure is simple and effectively reduces the vibrations due to the above mentioned resonance, this countermeasure is adopted in all of the customary mowing machines. As a result, there is no conventional mowing machine having a shaft the diameter of which is less than 7 millimeters. Namely, the diameter of the shaft used in conventional mowing machines is 7 millimeters or over. As the diameter of the shaft increases, the weight thereof necessarily increases so that it results in the increase in cost.

SUMMARY OF THE INVENTION

The present invention has been developed in order to remove the above mentioned drawbacks and disadvantages inherent to the conventional mowing machines.

It is, therefore, a primary object of the present invention to provide a mowing machine in which the occurrence of vibrations is remarkably suppressed.

Another object of the present invention is to provide such a mowing machine which is simple in construction.

A further object of the present invention is to provide such a mowing machine which is light in weight.

A still further object of the present invention is to provide such a mowing machine which is readily manufactured without employing special vibration proof means.

A still further object of the present invention is to provide such a mowing machine which is low in cost.

According to the present invention, resonance phenomenon due to the torsion vibrations in the rotational system of the mowing machine is effectively prevented by selecting the outer diameter of the shaft which transmits the rotational torque of the prime mover to the rotary blade, in view of various factors which define the torsional natural vibration frequency of the rotational system. However this does not mean that the mowing machine according to the present invention has a shaft the diameter of which is 7 millimeters or over. In other words, the diameter of the shaft is made samller than 7 millimeters.

BRIEF DESCRIPTION OF THE DRAWING

These and other objects and features of the present invention will become more readily apparent from the following detailed description of the preferred embodiment taken in conjunction with the accompanying drawing in which:

A mowing machine according to the present invention is schematically illustrated.

DETAILED DESCRIPTION OF THE PREFERRED EMBODIMENT

Prior to describing how vibrations are prevented from being produced in the present invention, the reason why vibrations occur in a customary mowing machine having a prime mover will be analyzed. Although the accompanying drawing shows a schematic view of the mowing machine according to the present invention as set forth hereinabove, the construction thereof is substantially the same as that of a customary mowing machine except that the outer diameter of the shaft is made different from that of conventional mowing machines. Therefore, the occurrence of vibrations in a customary mowing machine will be described with reference to the drawing.

The mowing machine according to the present invention as well as a customary one comprises a prime mover 6, such as an internal combustion engine, a centrifugal clutch 5 connected to the prime mover 6 at one end thereof, a shaft 1 connected to the other end of the centrifugal clutch 5 at one end thereof, a pipe 2 for covering or enclosing the shaft 1, a gear means 3 connected to the other end of the shaft 1 at one end thereof, and a rotary blade 4 connected to the other end of the gear means 3. A suitable handle means (not shown) may be connected to the pipe 2 so that the operator of the mowing machine is capable of supporting and moving the same. As is well known, the rotational torque generated by the prime mover 6 is transmitted via the centrifugal clutch 5, the shaft 1, and the gear means 3, such as a reduction gear assembly, to the rotary blade 4. The prime mover 6 and the gear means 3 are respectively covered by suitable casings (no numerals), and these casings are coupled by the pipe 2 in which the shaft 1 is rotatably disposed. Rotary portions of said prime mover 6, centrifugal clutch 5, shaft 1, gear means 3 and rotary blade 4 constitute the above mentioned rotational system. In the mowing machine illustrated, the torsional natural vibration frequency $\omega$ of the rotational system will be expressed by the following formula:

$$\omega = \frac{1}{2\pi}\sqrt{\frac{KI_1 I_2 n}{I_1 + I_2 n}}$$

wherein
$I_1$ is the moment of inertia at the side of the prime mover 6;
$I_2$ is the moment of inertia at the side of the rotary blade 4;
n is the speed reducing ratio in the gear means 3; and
k is the rotational spring modulus of the shaft 1:

The moment of inertia of the gear means 3, the moment of inertia of the shaft 1, and the rotational spring modulus of the rotary axle from the gear means 3 to the rotary blade 4 are omitted from the above formula since these factors have negligible influence on the torsional natural vibration frequency $\omega$ of the rotational system.

Furthermore, the rotational spring modulus K in the above formula will be expressed by the following equation:

$$K = \frac{\pi d^4 G}{32l}$$

wherein G is the modulus of elasticity in shear of the shaft 1;
d is the outer diameter of the shaft 1; and
l is the length of the shaft 1:

From the relationship defined by the above equations it will be understood that the torsional natural vibration frequency of the rotational system which extends from the prime mover 1 to the rotary blade 4 will be determined by the moment of inertia $I_1$ of the prime mover 6, the moment of inertia $I_2$ of the rotary blade 4, the speed reducing ratio n in the gear means 3, the length l, the outer diameter d and the modulus of elasticity G of the shaft 1. Among the above mentioned factors, $I_1$ will be a constant value if a prime mover to be used is determined; $I_2$ is a constant value since the outer diameter, the thickness and the material of the rotary blade 4 are substantially uniform throughout a number of products; n generally falls in a range between 0.8 and 1.0 and thus n makes a small contribution with respect to the variation in $\omega$; l is determined by the total length of the mowing machine, but generally l is substantially constant, and therefore it makes a small contribution with respect to the variation in $\omega$; G is constant since the shaft 1 is made of a steel bar. Accordingly, a factor which drastically influences on the torsional natural vibration frequency $\omega$ is the outer diameter d of the shaft 1, and d has a following relationship with respect to the torsional natural vibration frequency $\omega$:

$$\omega \propto d^2$$

Calculating the torsional natural vibration frequency $\omega$ in connection with a customary mowing machine by using the aforementioned formulas, we obtain respective values corresponding to each outer diameter d of the shaft 1 as shown in the following table (1):

TABLE (1)

| d | $\omega$ |
|---|---|
| 9 mm | 37 Hz |
| 8 mm | 29.3 Hz |
| 7 mm | 22.4 Hz |
| 6.5 mm | 19.3 Hz |

It is well known that a 2-cycle gasoline engine is used as the prime mover of mowing machines. In a 2-cycle gasoline engine, combustion takes place once per revolution, and when a 2-cycle engine rotates at a relatively low speed, irregularity in rotation may occur. This irregularity will be referred to as rotational variation, and it occurs periodically at a given frequency corresponding to the rotational frequency, the half or one third of the rotational frequency of the engine when measured during the operation of an engine at a speed between 3,500 and 8,000 rpm. The following table (2) shows a result of measurement with respect to the rotational variation.

TABLE (2)

| SORT OF ENGINE | | ENGINE rpm | | | |
|---|---|---|---|---|---|
| | | 3,500 rpm | 4,500 rpm | 5,500 rpm | 6,500 rpm |
| No. 1 | (DISPLACEMENT: 33 cc) | 20 Hz | 25 Hz | 30 Hz | 108 Hz |
| No. 2 | (DISPLACEMENT: 23 cc) | 19 Hz | 37 Hz | 91 Hz | 108 Hz |
| No. 3 | (DISPLACEMENT: 30 cc) | 30 Hz | 75 Hz | 90 Hz | 109 Hz |

From the above, it will be understood that the vibration frequency which causes a mowing machine to vibrate corresponds to one of the rotational speed of the engine, the half or one third of the rotational speed of the engine. These frequencies will be seen in the following table (3):

TABLE (3)

| Rotational Variation with Respect to Engine rpm | Engine rpm | | | | |
|---|---|---|---|---|---|
| | 3,500 rpm | 4,000 rpm | 4,500 rpm | 5,000 rpm | 5,500 rpm |
| 1/1 | 58.3 Hz | 66.7 Hz | 75 Hz | 83.3 Hz | 91.7 Hz |
| ½ | 29.2 Hz | 33.3 Hz | 37.5 Hz | 41.7 Hz | 45.8 Hz |
| ⅓ | 19.4 Hz | 22.2 Hz | 25 Hz | 27.8 Hz | 30.5 Hz |

In order that resonance phenomenon does not occur, the torsional natural vibration frequency of the rotational system of the mowing machine should not equal either the rotational frequency of the engine 6 or the rotational variation frequency of the engine 6. To this end it is necessary to set the torsional natural vibration frequency of the rotational system below one third of the lowest rotational speed of the engine or above the highest possible rotational speed of the engine.

On the other hand, the centrifugal clutch 5 of the drawing usually starts transmitting the rotational torque of the prime mover 6 to the shaft 1 when the rotational speed of the prime mover 6 exceeds approximately 4,000 rpm. Namely, when the rotational speed of the prime mover 6 is below 4,000 rpm, the centrifugal clutch 5 disconnects the output shaft (no numeral) of the prime mover 6 from the shaft 1. After the shaft 1 is disconnected from the output shaft of the prime mover 6, resonance phenomenon does not occur inasmuch as the moment of inertia $I_1$ at the side of the prime mover 6 disappears (see the aforementioned formulas for deriving the torsional vibration frequency $\omega$). Namely, under the above mentioned condition the torsional natural vibration frequency becomes quite large so that it will not equal the rotational frequency of the prime mover 6 or the half or one third of the rotational frequency of the prime mover 6.

From the above it will be recognized that the torsional natural vibration frequency of the rotational system is set to 19.3 Hz which is lower than 22.2 Hz corresponding to one third of the rotational frequency of 66.7 Hz of 4,000 rpm rotation, above which the centrifugal clutch 5 starts transmitting the rotational torque of the prime mover 6 to the shaft 1, by selecting the outer diameter of the shaft 1 to be 6.5 millimeters.

Summarizing the embodiment of the drawing of the present invention, in a portable mowing machine having a general construction such that a rotary blade 4 is connected via a gear means 3 to a shaft 1 covered by a pipe 2 at one end of the shaft 1, while the other end of the shaft 1 is connected via a centrifugal clutch 5 to a 2-cycle engine the displacement of which is between about 20 and 50 cc, the centrifugal clutch 5 starts transmitting the engine torque to the shaft 1 when the engine rpm exceeds approximately 4,000 rpm, the outer diameter of the shaft 1 is selected such that the torsional natural vibration frequency of the rotational system including the rotary blade 4, the shaft 1 and the engine 6 is below one third of the rotational speed of the engine 6 above which the centrifugal clutch 5 starts transmitting the engine torque, namely 22.2 Hz. Although in the embodiment described herein the outer diameter of the shaft 1 is 6.5 millimeters. This diameter may be further reduced to a smaller value if desired. The shaft 1 in the embodiment is a round steel bar or rod. However, the shape of the shaft 1 is not limited to this round one. Namely, a shaft having other cross-sectional shape, such as square, may be used in place of the above mentioned round shaft. Furthermore, the shaft 1 may be either hollow or solid. In addition the shaft 1 is not necessarily a bar-shaped one, and therefore, a flexible material, such as a wire, may be used as the shaft 1.

From the above, it will be understood that the mowing machine according to the present invention is advantageous compared with conventional machines in that the occurrence of vibrations is effectively suppressed by selecting the outer diameter of the shaft 1 in such a manner that the torsional natural vibration frequency does not equal the rotational speed of the engine or the half or one third of the rotational speed of the engine 6, so that resonance phenomenon will not occur. Since the outer diameter of the shaft 1 is reduced compared to that in conventional mowing machines, the size of other portions in the vicinity of the shaft 1 may be reduced in the same manner so that the total weight of the mowing machine according to the present invention is reduced compared with conventional mowing machines. Such reduction in weight will result in the suppression of the cost.

The above described embodiment is just an example, and therefore, many modifications and variations will be made without departing from the spirit of the instant invention.

What is claimed is:

1. A mowing machine having a prime mover, a centrifugal clutch connected to said prime mover at one end thereof, a shaft connected to the other end of said centrifugal clutch at one end thereof, a gear means connected to the other end of said shaft, a rotary blade connected via said gear means to said shaft, and a pipe for covering said shaft, said centrifugal clutch starting transmission of the rotational torque of said prime mover to said shaft when the rotational frequency of said prime mover exceeds a predetermined value, rotary portions of said prime mover, centrifugal clutch, shaft, gear means and rotary blade constituting a rotational system, wherein the improvement comprises:
the outer diameter of said shaft is selected such that the torsional natural vibration frequency of said rotational system is below one third of said predetermined value.

2. A mowing machine as claimed in claim 1, wherein said prime mover comprises a 2-cycle internal combustion engine.

3. A mowing machine as claimed in claim 1, wherein said gear means comprises a reduction gear assembly.

4. A mowing machine as claimed in claim 1, wherein said shaft comprises a hollow bar.

5. A mowing machine as claimed in claim 1, wherein said shaft comprises a solid bar.

6. A mowing machine as claimed in claim 1, wherein said shaft comprises wire.

7. A mowing machine as claimed in any one of claims 4 to 6, wherein said shaft is made of steel.

8. A mowing machine as claimed in claim 1, wherein said predetermined value is approximately 4,000 rpm, and wherein said outer diameter of said shaft is 6.5 millimeters or below.

9. A mowing machine as claimed in claim 1, further comprising a handle means connected to said pipe.

10. A method of preventing resonance phenomenon from occurring in a mowing machine having a prime mover, a centrifugal clutch connected to said prime mover at one end thereof, a shaft connected to the other end of said centrifugal clutch at one end thereof, a gear means connected to the other end of said shaft, a rotary blade connected via said gear means to said shaft, and a pipe for covering said shaft, said centrifugal clutch starting transmission of the rotational torque of said prime mover to said shaft when the rotational frequency of said prime mover exceeds a predetermined value, rotary portions of said prime mover, centrifugal clutch, shaft gear means and rotary blade constituting a rotational system, said method comprising the step of:
selecting the outer diameter of said shaft such that the torsional natural vibration frequency of said rotational system is below one third of said predetermined value, said torsional natural vibration frequency $\omega$ being expressed by:

$$\omega = \frac{1}{2\pi}\sqrt{\frac{KI_1 I_2 n}{I_1 + I_2 n}}$$

wherein $I_1$ is the moment of inertia at the side of said prime mover;

$I_2$ is the moment of inertia at the side of said rotary blade;

n is the speed reducing ratio in said gear means; and k is the rotational spring modulus of said shaft:

said factor K being expressed by:

$$K = \frac{\pi d^4 G}{32 l}$$

wherein

G is the modulus of elasticity in shear of said shaft;

d is the outer diameter of said shaft; and l is the length of said shaft.

* * * * *

UNITED STATES PATENT OFFICE
CERTIFICATE OF CORRECTION

PATENT NO. : 4,295,272
DATED : October 20, 1981
INVENTOR(S) : Toshifumi Kubota

It is certified that error appears in the above—identified patent and that said Letters Patent are hereby corrected as shown below:

IN THE SPECIFICATION:

Column 3, line 20, delete: " $\dfrac{KI_1I_2n}{I_1+I_2n}$ "

and insert therefor: -- $\dfrac{K(I_1+I_2n^2)}{I_1I_2n^2}$ --

IN THE CLAIMS:

Claim 10, line 65, delete: " $\dfrac{KI_1I_2n}{I_1+I_2n}$ "

and insert therefor: -- $\dfrac{K(I_1+I_2n^2)}{I_1I_2n^2}$ --

Signed and Sealed this

Twenty-sixth Day of January 1982

[SEAL]

Attest:

Attesting Officer

GERALD J. MOSSINGHOFF

Commissioner of Patents and Trademarks